Nov. 24, 1931.  J. G. BAUMBACH  1,833,480
WORM AND GEAR HOUSING
Filed Feb. 19, 1930
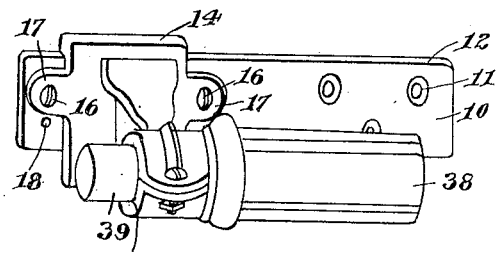
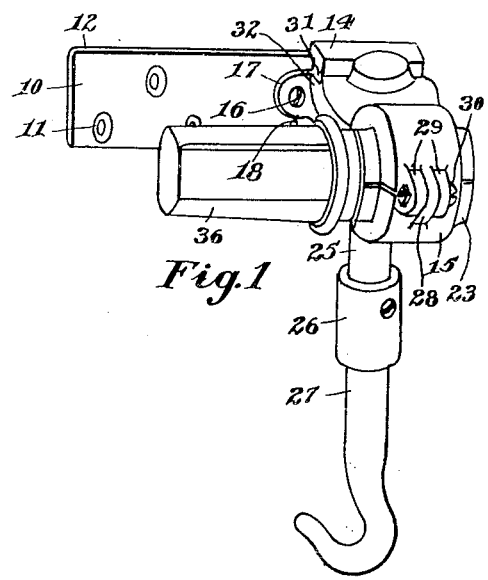
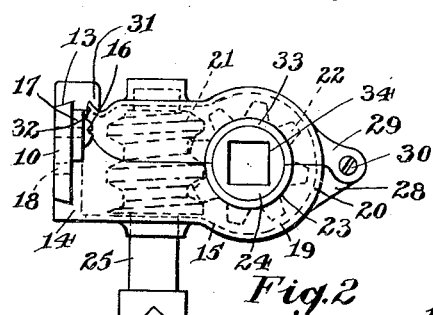
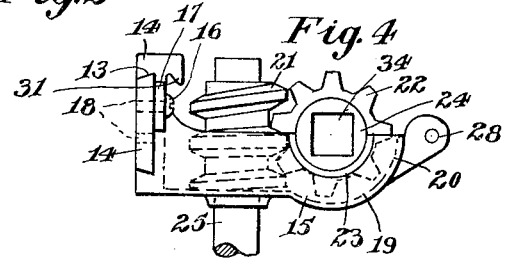
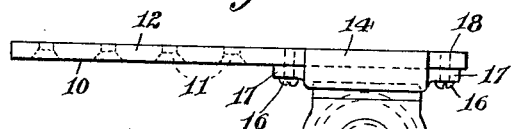
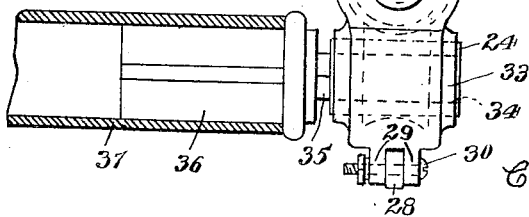
INVENTOR.
John G. Baumbach
BY
Chamberlain & Newman
ATTORNEYS.

Patented Nov. 24, 1931

1,833,480

UNITED STATES PATENT OFFICE

JOHN G. BAUMBACH, OF NORWALK, CONNECTICUT

WORM AND GEAR HOUSING

Application filed February 19, 1930. Serial No. 429,555.

The present invention relates to awning fixtures and more especially to a combined roller bracket and worm and gear housing as employed in connection with awnings for rolling up and running out the same.

It is the object of my invention to provide an improved form of combined roller bracket and worm and gear housing, for the purpose specified, which may be used as a right or left so-called, for operatively supporting either end of an associated roller. Further to provide a housing which is so constructed that rain water and the like will not get in and become frozen or rusted and prevent the easy operation of the worm and gear.

A further feature of the invention is to provide a two-part bracket, an upper and lower, the lower bracket being adapted to form the support for the roller and the worm and gear operating means, and the upper part as a cover or closure member adapted to be attached and secured in position to the lower member by a single screw so as to permit the cover to be readily detached should occasion require.

My invention is also applicable to a detachable right or left form of bracket to be used as a support for the end of the roller distant from the worm and gear, through which the roller is operated.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size, and minor details of construction within the scope of the claims may be resorted to without departure from the spirit, or sacrificing any of the advantages of the invention.

Similar characters of reference denote like or corresponding parts throughout the several figures of the accompanying drawings forming a part of this specification and upon which Fig. 1 shows a perspective view of my improved form of worm and gear housing including an attached supporting plate, bushing and shaft hook;

Fig. 2 is an end view of the device shown in Fig. 1, the bushing being omitted;

Fig. 3 is a top plan view of the invention as shown in Fig. 1, and with the near end portion of a roller shown attached;

Fig. 4 is a side view corresponding in part with Fig. 2 though having the detachable cover removed;

Fig. 5 is a side elevation of the cover as removed from Fig. 4; and

Fig. 6 shows a perspective view in operative alignment with Fig. 1 of an adjustable bracket, for supporting the pintle that carries the end of the roller farthest from the operating gears.

Referring in detail to the characters of reference marked upon the drawings, 10 represents a plate which is provided with a series of screw holes 11, adapting it for attachment to the upper horizontal frame portion of a store window. These plates are usually applied adjacent the upper corner portions of a window and being reversible, can be so applied, as to bring their supporting end portions in alignment with the side of the window frame, and which in some instances may be the side frame between two windows.

The horizontal edge portions 12—12 of this plate are beveled, as shown, to engage the dovetailed guideway 13 of the base 14 of the bracket comprising the lower housing member 15, which base is adapted to be attached to either end of the plate through the screws 16—16 positioned in ears 17—17 of the base of the housing and adapted to engage either the two upper or two lower aligned threaded holes 18—18 in the end of the plate. This lower portion of the housing bracket, aside from the base, includes parallel sides 19—19 and a forward end 20, making it dish-like in form to accommodate the worm 21 and worm gear 22 and a lubricant in which they operate.

This lower member includes aligned semi-circular bearings 23 in which the bearing hub portions 24 of the worm gear 22 are journaled and adapted to turn through the operation of the worm. This worm is mounted upon a short shaft 25 journaled in aligned bearings of the upper and lower housing members and is provided with a coupling 26 by means of which the shaft hook 27 is attached thereto. The lower member is further provided with an ear 28 to which the upper housing member screwed. The upper housing member is provided with two ears 29 which are formed in spaced relation to receive therebetween the ear 28. The three said ears are provided with aligned holes in which the fastening or locking screw 30 is positioned.

A horizontally disposed inclined shoulder 31 is provided along the upper portion of the base of the bracket to receive the correspondingly shaped horizontal edge portion 32 of the rear end of the upper housing so as to provide attaching means for that end of the housing and whereby when the same is closed it can be securely fastened by means of the one screw 30. Aligned circular bearing portions 33 are also provided in the under side of this top housing member to register with those of the lower member and to accommodate and form complete bearings for the hubs 24 of the gear. It will be noted that by this form of separable housing a relatively tight fit for the parts and lubricant is produced and water thereby prevented from entering, to freeze and rust the operative parts therein.

The worm gear 22 is provided with a square hole 34 therein to accommodate the square end 35 of the bushing 36 upon which one end of the awning roller 37 is positioned. The other end of the roller is usually supported in a somewhat similar bushing 38 having a pintle end 39. This bushing, like the bushing 36, is adapted to be inserted in one end of a tubular roller 37 in a way to frictionally engage the same to insure the turning of the roller by the action of the worm and gear for raising and lowering the awning.

This pintle-end of the bushing 38 is supported in a bearing 23 of the bracket, which is formed somewhat like the bearing of the lower housing member. The base of this bracket is also provided with a horizontal guideway having parallel dovetail edges to receive the plate 10 upon which it is positioned and secured. Ears 17—17 are also formed on this base to receive screw 16 for its attachment to the plate. By this form of construction it will be apparent that the bracket is reversibly attached to the plate 10 and like the housing bracket can be used as a right or left.

In the operation of the worm and gear, as illustrated herein, it is customary for the operator to use a rod having a hook or an eye upon its upper end for engagement with the hook 27 shown herein and thereupon to turn the rod to the right or left as may be necessary to raise or lower the awning.

Having thus described my invention, what I claim and desire to secure by Letters Patent is:

1. The combination of a plate having upper and lower beveled edges and means for its attachment to a window frame, said plate also having aligned screw holes in one end portion, a bracket including a base having ways to engage the beveled edges of the plate and adapted for reversible attachment thereto, screws to engage the holes in the plate to secure the base to the plate in either of said reversible positions, a worm journaled in said bracket for vertical rotation, and a gear meshing with the worm and journaled for horizontal rotation, and having means for supporting one end of a roller.

2. The combination of a plate having upper and lower beveled edges and means for its attachment to a window frame, said plate also having aligned screw holes in one end portion, a bracket including a base having ways to engage the beveled edges of the plate and adapted for reversible attachment thereto, said base also including a transverse shoulder, screws to engage the holes in the plate to secure the base to the plate in either of said reversible positions, a worm journaled in said bracket for vertical rotation, and a gear meshing with the worm and journaled for horizontal rotation, and having means for supporting one end of a roller, a detachable cover, one end of which is adapted to engage the said shoulder, and a screw to secure the outer end of the cover to the bracket to form enclosed housing.

3. The combination of a plate having means for its attachment to a window frame and having aligned screw holes in one end portion, a bracket including a base having means for the reversible attachment to the plate and including a transverse shoulder, screws to engage the holes in the plate to secure the base to the plate in either of said reversible positions, a worm journaled in said bracket for vertical rotation, and a gear meshing with the worm and journaled for horizontal rotation and having means for supporting one end of a roller, a detachable cover one end of which is adapted to engage the said shoulder, and a screw to secure the outer end of the cover to the bracket to form enclosed housing.

4. The combination of a worm gear housing including a base having a transverse shoulder, a worm journaled in said base for vertical rotation, and a gear meshing with the worm and journaled for horizontal rotation and having means for supporting one end of a roller, a detachable cover one end of which is adapted to engage the said shoulder, and a screw to secure the outer end of the cover to the bracket to form an enclosed housing.

5. The combination of a worm gear housing including a base having a transverse shoulder, a detachable cover one end of which is adapted to engage the said shoulder, a screw to secure the outer end of the cover to the base to form an enclosed housing, a vertically disposed shaft one end of which is journaled in an inclosed bearing of the cover, a worm on the shaft, a gear meshing with the worm and journaled in bearings of both the bracket and cover.

6. In an awning bracket the combination of a plate having means for its attachment to a window frame, said plate having a pair of screw holes adjacent each its top and bottom edges, a bracket adapted for reverse attachment to the plate and having screw holes to register with either pair of holes in the plate, screws for said holes to secure the bracket to the plate in either of its reversible positions, said bracket also including a projected supporting means adapted to rotatably support an awning roller therein.

7. In an awning bracket the combination of a plate having means for its attachment to a window frame, said plate having a pair of screw holes adjacent both its top and bottom edges, a bracket adapted for reverse attachment to the plate and having projected ears on opposite sides with screw holes therein to register with either pair of holes in the plate, screws for said holes to secure the bracket to the plate in either of its reversed positions, said bracket also including a projected supporting means adapted to rotatably support an awning roller therein.

8. In an awning bracket, a worm and gear housing including a base portion and an extended hollow bracket portion having a vertical and horizontal bearing, a worm and gear operatively mounted in the housing, a shaft journaled in one of the bearings of the bracket and extended through the worm, and a detachable cover for the bracket having an enclosed bearing to receive and cover the upper end of said shaft.

9. In an awning bracket the combination of a worm and gear housing including a base having means for its attachment to a window frame, and an extended recessed bracket portion to receive a worm and gear, and having a vertical and horizontal bearing, a shaft journaled in a bearing of the bracket, a worm upon the shaft, a gear having a shouldered hole therethrough and extended finished round hub portions journaled in the bearing of the bracket, a detachable cover for the bracket, having an inclosed bearing for the shaft and a bearing for the hub of the worm.

10. In an awning bracket the combination of a worm and gear housing including a base having means for its attachment to a window frame, and including an over hanging transverse shoulder and an extended recessed bracket with vertical and horizontal bearings, a worm and worm shaft and a worm gear operatively mounted within said bracket, a removable cover for said bracket worm and gear, one end of said bracket being adapted to engage the said shoulder, another portion including an inclosed bearing covering the end of the worm shaft, and screw means to secure the outer end of said cover to the bracket to form an inclosed housing.

Signed at Norwalk, in the county of Fairfield and State of Connecticut, this 17th day of Feb., A. D. 1930.

JOHN G. BAUMBACH.